(12) United States Patent
Kasuga et al.

(10) Patent No.: US 6,366,003 B1
(45) Date of Patent: Apr. 2, 2002

(54) ULTRASONIC MOTOR AND ELECTRONIC APPARATUS WITH ULTRASONIC MOTOR

(75) Inventors: Masao Kasuga; Akihiro Iino; Makoto Suzuki; Kenji Suzuki, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/402,519
(22) PCT Filed: Apr. 2, 1998
(86) PCT No.: PCT/JP98/01577
§ 371 Date: Jan. 19, 2000
§ 102(e) Date: Jan. 19, 2000
(87) PCT Pub. No.: WO98/45933
PCT Pub. Date: Oct. 15, 1998

(30) Foreign Application Priority Data

Apr. 9, 1997 (JP) .............................................. 9-091218

(51) Int. Cl.[7] .................................................. H02N 2/00
(52) U.S. Cl. .......................... 310/316.02; 318/323.04; 318/323.05
(58) Field of Search ....................... 310/323.04, 323.05, 310/316.02

(56) References Cited

U.S. PATENT DOCUMENTS 5,592,041 A * 1/1997 Kasuga et al. .............. 310/316
5,619,089 A * 4/1997 Suzuki et al. ................ 310/323
5,770,912 A * 6/1998 Suzuki et al. ................ 310/316
6,144,140 A * 11/2000 Iino et al. ............... 310/316.02

FOREIGN PATENT DOCUMENTS

JP 07-099787 * 4/1995

* cited by examiner

Primary Examiner—Nestor Ramirez
Assistant Examiner—Peter Medley
(74) Attorney, Agent, or Firm—Adams & Wilks

(57) ABSTRACT

A compact ultrasonic motor is made easy to assemble and replace in an electronic apparatus by providing various electronic circuit components on a connector formed integrally with the ultrasonic motor. In one embodiment, a piezoelectric element is in contact with a vibrating body for undergoing vibration along with expansion-and-contraction movement of the piezoelectric element. A moving member is in contact with the vibrating body for undergoing movement in a desired direction in response to vibration of the vibrating body. A support member supports the piezoelectric element, the vibrating body, the moving member, along with a driving circuit for driving the ultrasonic motor and a connector for connecting the piezoelectric element to the driving circuit. The driving circuit is an AC signal generating circuit for supplying an AC signal to the piezoelectric element and a phase adjusting device for adjusting phase characteristics of the AC signal generating circuit. By providing the driving circuit and the connector on the support member, the ultrasonic motor is compact and easy to handle.

19 Claims, 5 Drawing Sheets

ULTRASONIC MOTOR AND ELECTRONIC APPARATUS WITH ULTRASONIC MOTOR

TECHNICAL FIELD

This invention relates to an ultrasonic motor for use in a timepiece, etc., and to an electronic appliance using the same.

BACKGROUND ART

Recently, ultrasonic motors featured by small size and light weight have been used in small-sized precision appliances, such as timepieces.

The conventional ultrasonic motor 100 is structured as shown in a structural block diagram (FIG. 4) and perspective view (FIG. 5), such that on a support plate 102, a piezoelectric element 103 is provided, and a vibration member 104 is joined to the piezoelectric element 103, a moving member 105 is rotatably rested on projections 104a, 104a of the vibration member 104, a pressurizing means 106 urges the moving member 105 in pressure contact with the moving member 104, and a connection circuit means 107 is provided for electrical connection.

This ultrasonic motor 100 has been built in an electronic appliance, together with a separately fabricated drive circuit (driving driver 109, externally attached part 110) 108, adjusting capacitor 111, control circuit 112 and power source 113.

The ultrasonic motor 100 has been configured so that a current given from the power source 113 is converted into a required alternating current by the drive circuit 108 and the adjusting capacitor 111, thereby being driven by the supply of alternating current under control of the control circuit 112.

In such a case, the current which is to be converted into an alternating current and supplied by the power source 113 to the driving driver 109 has been corrected for being adapted to a phase characteristic of a motor drive section of the ultrasonic motor 100 by adjustment in capacitance of the adjusting capacitor 111.

In the conventional device, however, the drive circuit 108 has been fabricated separately from the ultrasonic motor 100 as described above. consequently, after manufacture the adjusting capacitor 111 in a stage of mutual connection is required to be changed in capacitance so that the phase of the alternating current supplied through the drive circuit 108 is adapted to a phase characteristic of the motor drive section of the ultrasonic motor 100.

Due to this, phase characteristic errors in the motor drive section of an individual ultrasonic motor 100 and phase characteristic errors in an individual drive circuit 108 have to be corrected by the capacitance adjustment of the adjusting capacitor 111, when assembled onto an electronic appliance, replaced, repaired or so. Thus, it is difficult for the ultrasonic motor 100 to be repaired or replaced.

Even in a case that repairing is done by a knowledgeable technician, the ultrasonic motor 100 and the drive circuit 108 require separate preparation and adjustment, thus raising repair cost. This is true for a manufacturing process for an electronic appliance built with such an ultrasonic motor 100, also raising manufacture cost therefor.

Also, despite the fact that the ultrasonic motor 100 is small in size, the increase in size of the separately-fabricated drive circuit 108 also results in an increase in size of an electronic appliance to be built with the same.

Also, the ultrasonic motor 100 and the drive circuit 108 if separated would make assembly troublesome due to an adjustment operation besides increasing the number of assembly operation processes for incorporating them into an electronic appliance, resulting in the increase of manufacturing cost.

Also, in the conventional ultrasonic motor 100, the support plate 102 has been made of metal so that the same support plate 102 is connected as an electrode to a circuit board of an electronic appliance to be built with the ultrasonic motor 100. Accordingly, there has been a necessity of providing on the support plate 102 an insulator for providing a connection circuit means 107 thus making the manufacture complicated. Also, where incorporating the ultrasonic motor 100 in an electronic appliance, wiring connection should be necessarily secured between the electronic appliance circuit board and the support plate 102, thus lowering design freedom.

It is a first object of this invention to provide an ultrasonic motor which is compact and easy to handle but facilitates incorporation in an electronic appliance or the like or to repair. It is a second object to provide an electronic appliance provided with this ultrasonic motor.

DISCLOSURE OF THE INVENTION

In order to solve the above problem, an ultrasonic motor according to one aspect of the invention is an ultrasonic motor having a piezoelectric element to undergo expansive-and-contractive movement due to application of alternating current, a vibration member to be vibrated by the expansive-and-contractive movement of the piezoelectric element, a moving member to be driven by the vibration of the vibration member, and a connection circuit means for electrical connection, the ultrasonic motor characterized in that a drive circuit for converting a current from a power source into a required alternating current to be supplied to an ultrasonic motor drive section is provided in the connection circuit means.

According to the invention, because the connection circuit means is structurally provided with the drive circuit, the ultrasonic motor is a single unit including the drive circuit.

Accordingly, it is possible to build, or replace, as a compact and easy-handled single unit including the drive circuit in an electronic appliance, facilitating incorporation or replacement and repair.

An ultrasonic motor according to another aspect has the connection circuit means provided with a phase adjusting section to adjust phase characteristics of the ultrasonic motor drive section and the drive circuit.

According to the invention, because the ultrasonic motor is provided with the phase adjusting section in the connection circuit means, the phase characteristic of the ultrasonic motor drive section and drive circuit can be easily adjusted by the phase adjusting section during manufacturing and assembling the ultrasonic motor.

Consequently, after manufacture, there is no need for conducting adjustment again upon assembling into an electronic appliance or during replacement, thus facilitating assembling into an electronic appliance or repair.

Consequently, after manufacture, there is no need for conducting the adjustment again upon assembling into an electronic appliance or during replacement, thus facilitating assembling into an electronic appliance or repair.

An ultrasonic motor according another aspect of the invention is an ultrasonic motor wherein the connection circuit means are provided integral with the support plate. According to this aspect of the invention, the connection circuit means is provided integral with the support plate, and the connection circuit means and the support plate can be handled as a single part. The ultrasonic motor during manufacture is easy to handle, reducing the manufacture process and relieving manufacturing labor.

The invention according to another aspect is an electronic appliance, and is characterized by being provided with an ultrasonic motor according to any one of the foregoing aspects.

As above, according to the invention of the foregoing aspect, the electronic appliance has an ultrasonic motor that is easy to assemble, replace or repair.

BEST MODE FOR PRACTICING THE INVENTION

Hereinafter, explained in detailed is an ultrasonic motor according to embodiments of the present invention.

Figure 1:
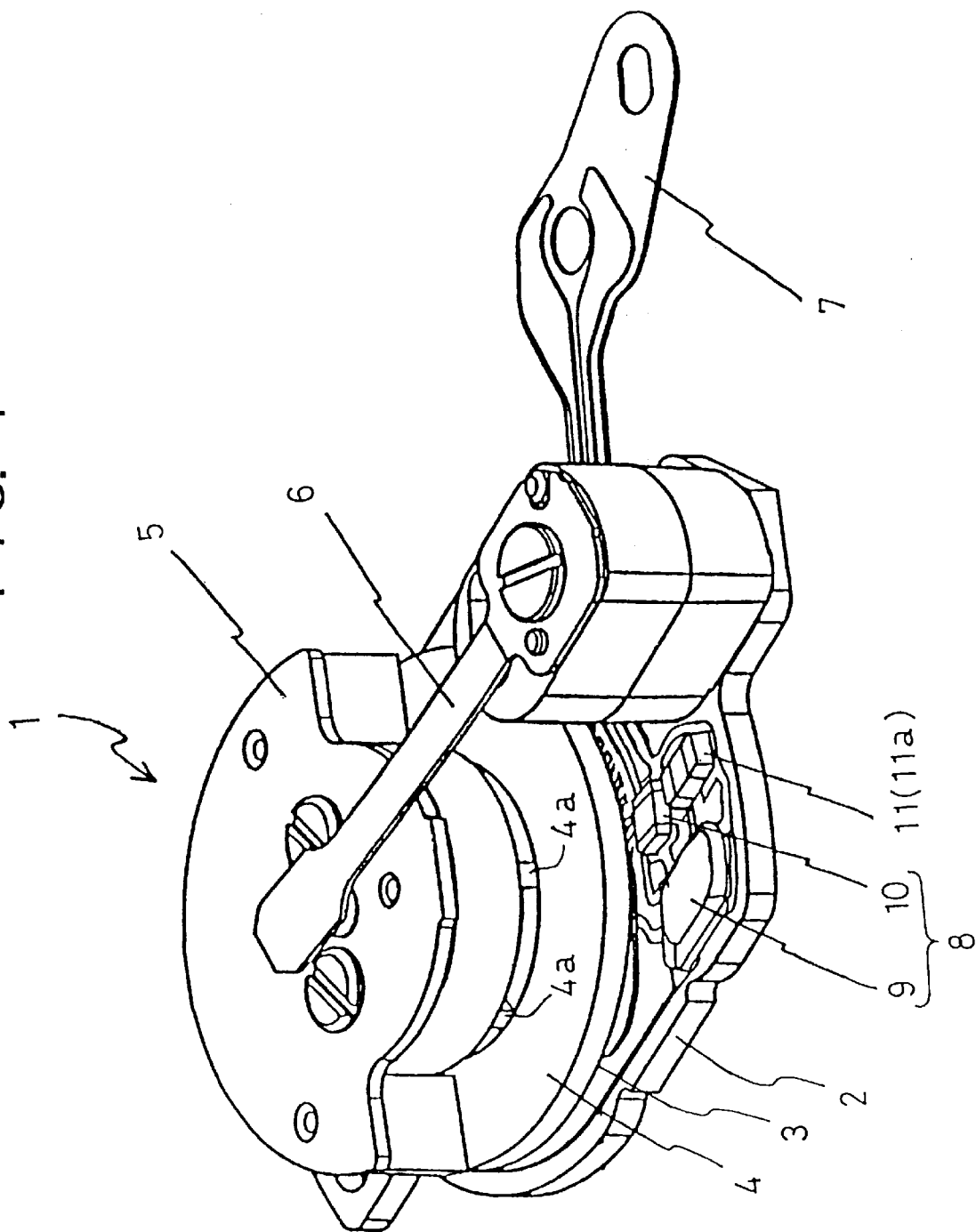
FIG. 1 is an perspective view of a ultrasonic motor according to a first embodiment of the present invention.
Figure 2:
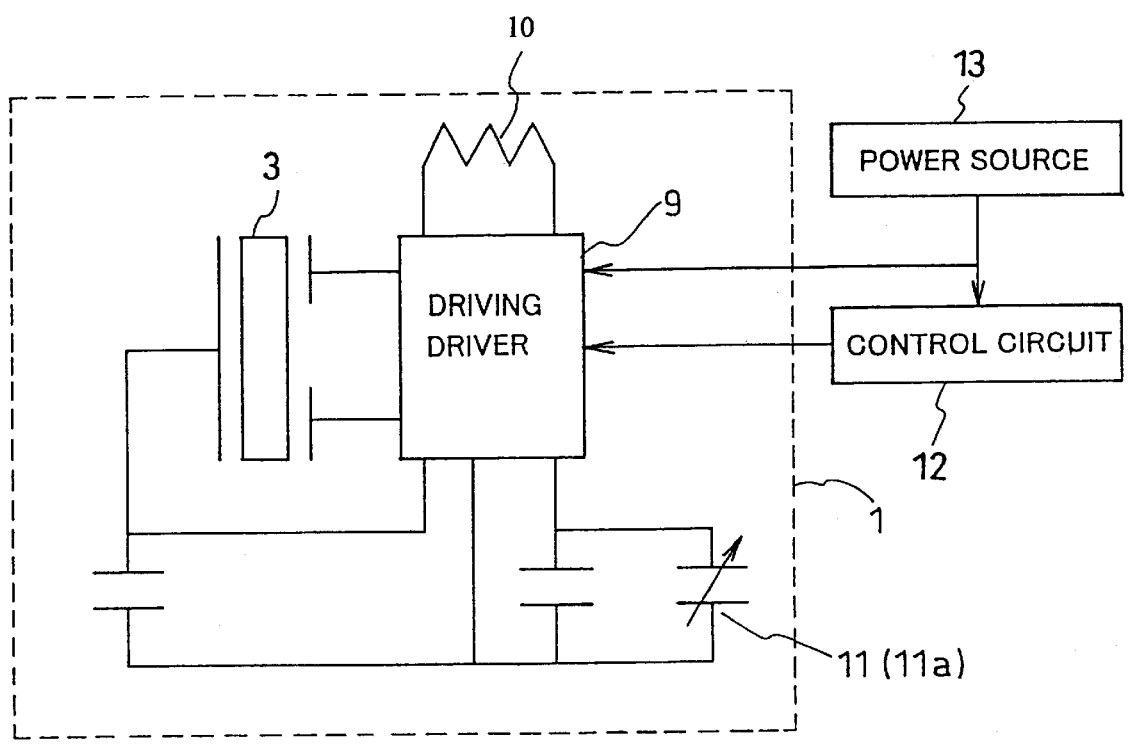
FIG. 2 is an circuit connection diagram of a ultrasonic motor according to the first embodiment of the present invention.
Figure 3:
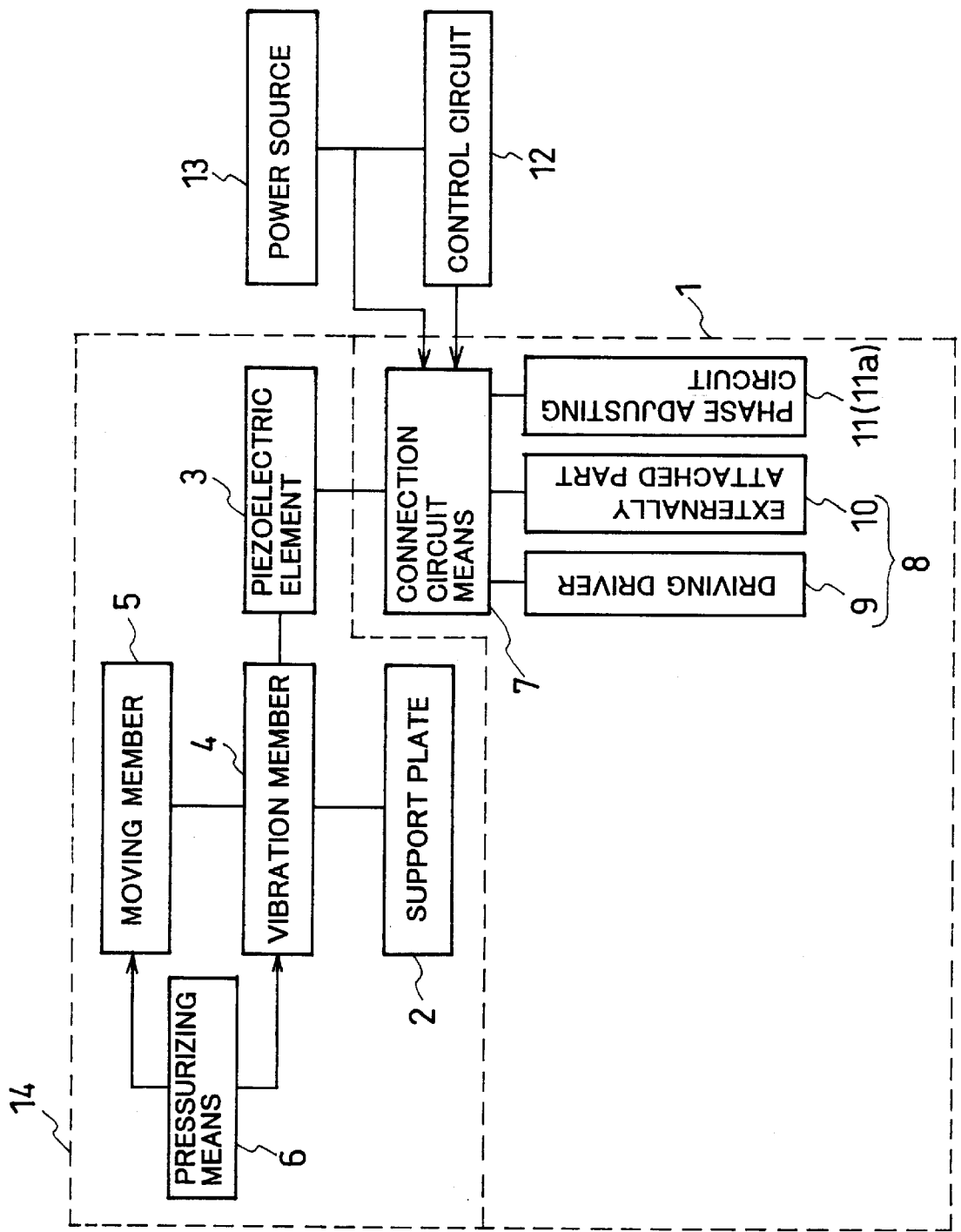
FIG. 3 is an block diagram of a ultrasonic motor according to the first embodiment of the present invention.
Figure 4:
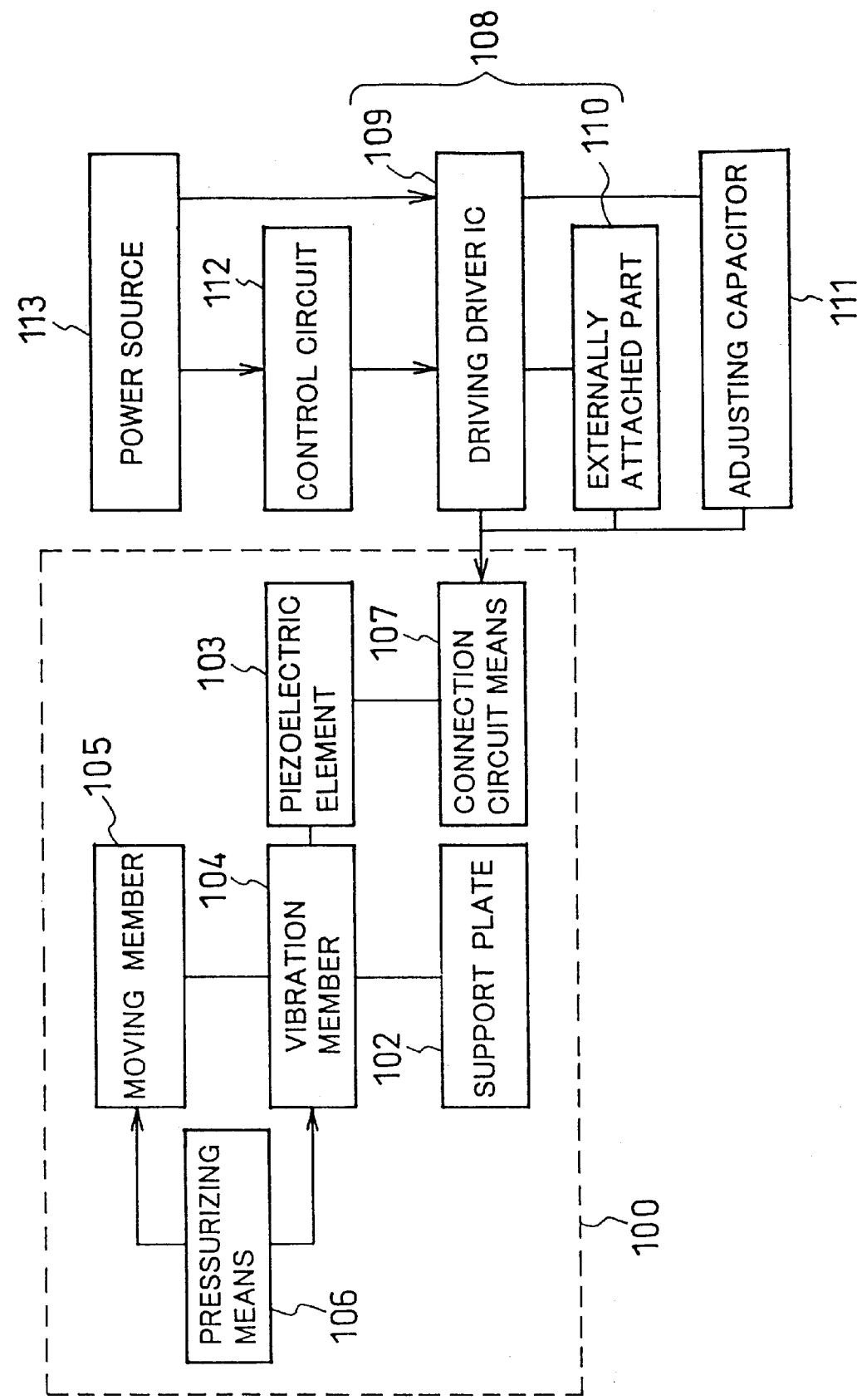
FIG. 4 is a structural block diagram of a conventional ultrasonic motor.
Figure 5:
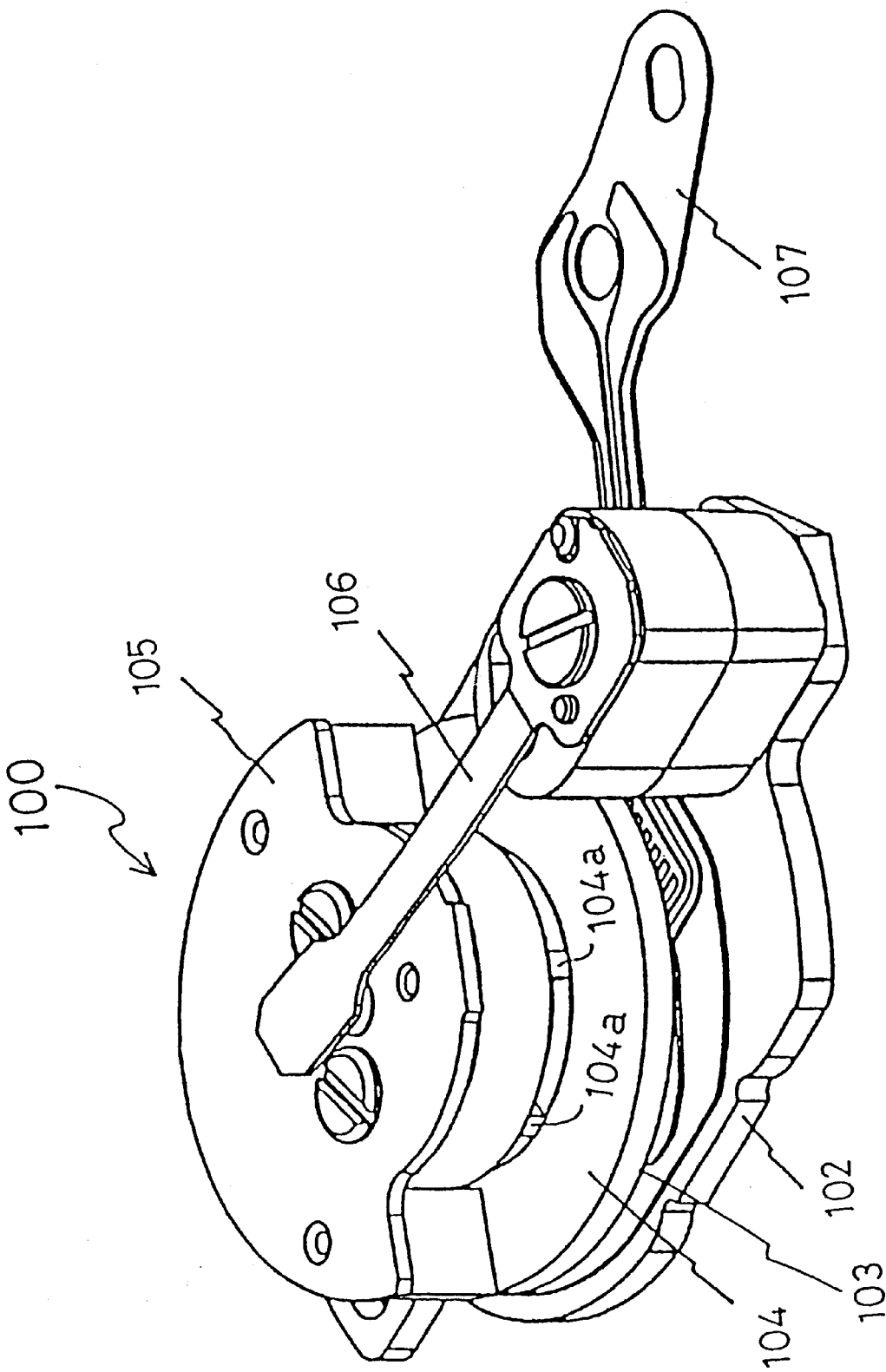
FIG. 5 is a perspective view of the conventional ultrasonic motor.

First, an ultrasonic motor according to a first embodiment of the present invention will be explained based on FIG. 1 to FIG. 3. FIG. 1, FIG. 2 and FIG. 3 are respectively a perspective view, a circuit connection diagram and a configuration block diagram of the ultrasonic motor according to the embodiment of the present invention.

The ultrasonic motor 1 according to this embodiment is configured as follows.

That is, as shown in FIG. 1, on a support plate 2 is mounted an ultrasonic motor drive section 14 structured by a vibration member 4 fixed in a non-rotatable state, a piezoelectric element 3 joined to an underside of the vibration member 4, a moving member 5 rotatably placed on projections 4a, 4a of the vibration member 4, a pressurizing means 6 for exerting pressure on a rotation center of the moving member 5 in a direction of pressure-contact with, the projections 4a, 4a of the vibration member 4, and so on.

Also, the support plate 2 is integrally fitted thereon with a connection circuit means (connection board) 7 for connection with an electric system. The connection circuit means 7 has a drive circuit 8 and phase adjusting circuit 11 as a phase adjusting section integrally arranged thereon.

When the ultrasonic motor 1 is built in an electronic apparatus or the like, a power supply 13 and a control circuit 12 for performing switch control or the like is connected to the connection circuit means 7. In the connection state, the electric current supplied from the power supply 13 is controlled by the control circuit 12.

The drive circuit 8 is configured, for example, by an IC-made driving driver 9 and an externally-attached part 10, such as a resistor. The driving driver 9 converts the current, such as a direct current, supplied from the power supply 13 into a high frequency alternating current (drive current to the ultrasonic motor) and supplies the converted alternating current to the piezoelectric element 3 via the connection circuit means 7.

The phase adjusting circuit 11 is used to correct the current, if supplied through the driving driver 9 by conversion into an alternating current, for adaptation to a phase characteristic of the ultrasonic motor drive section 14, and configured by a variable capacitor 11a (or capacitors exchangeable and different in capacitance).

The ultrasonic motor 1 according to this embodiment is constructed as described above. Accordingly, when attaching a connection circuit means 7 during manufacture, the alternating current supplied from the driving driver 9 can be corrected in a manner adapted for a phase characteristic of the ultrasonic motor drive section 14 by the phase adjusting circuit 11, depending on phase characteristic error in the ultrasonic motor drive section 14 and drive circuit 8.

Thereafter, there is no need for conducting phase adjustment where the ultrasonic motor 1 is built into an electronic apparatus or replaced. Meanwhile, when the ultrasonic motor 1 becomes faulty, it is satisfactory to merely replace it with a separately prepared ultrasonic motor 1 thus eliminating the necessity of phase adjustment.

Accordingly, it becomes very easy for the ultrasonic motor 1 to carry out assembling operation onto an electronic apparatus, replacement and so on.

Incidentally, the resistor 10 or the like may be built in the driving driver 9 instead of externally attached.

Although an ultrasonic motor 1 as a second embodiment is structured generally the same as the first embodiment, it is characterized in that provided on the support plate 2 is a flexible circuit board having a drive circuit 8 on the support plate 2.

This flexible circuit board is an independent member formed of polyimide as an insulator. This on a surface is formed with a printed circuit board to have a connection board 7 and is attached after provided with a drive circuit 8 to the support plate 2.

In this manner, the polyimide-formed flexible circuit board can be handled as one member having the connection board 7 and the drive circuit 8 on the surface. Accordingly, it becomes easy to handle in the manufacturing process as compared to the case of providing a connection board 7 and drive circuit 8 after providing an insulator on the support plate 2.

Also, because assembling the drive circuit 8 onto the flexible circuit board through soldering can be implemented at a separate site from the architecture for the ultrasonic motor section 14 as a mechanical assembling process, the manufacture line is increased in freedom of arrangement.

Incidentally, although the polyimide was listed as a material of the flexible circuit board, other polymer materials if print wiring is possible may be satisfactory.

An ultrasonic motor 1 as a third embodiment, although generally similarly structured to the first embodiment, is characterized in that, particularly, the support plate 2 is formed of an insulator and constructed to allow for configuring a circuit.

The support plate 2 of this embodiment is a substrate formed of an engineering plastic to have a connection board 7 micro-photolithographically formed thereon and a drive circuit 8 provided on a surface thereof.

In this manner, a support plate 2 with an insulation effect is obtained by using for the support plate 2 a resin having a proper hardness and of an insulator. Where an ultrasonic motor 1 provided with this support plate 2 is built and used in an electronic appliance, the electrical connection between the ultrasonic motor 1 and the circuit board occurs only through the connection board 7 on the support plate 1. Accordingly, the ultrasonic motor 1 mounting on the circuit board is increased in freedom making it easy to design an electronic appliance circuit.

As above, according to the ultrasonic motor in one embodiment, the connection circuit means is provided with a drive circuit to make an ultrasonic motor as a single unit, and it becomes compact and easy to handle.

Accordingly, assembling onto an electronic appliance or replacement can be performed as one single unit including the drive circuit. The assembling or replacement/repair becomes easy, and manufacturing cost can be held low.

According to the ultrasonic motor in another aspect of the invention, the connection circuit means is provided with a phase adjusting section. Accordingly, in addition to the above-described effect, an advantage is obtained such that during manufacturing/assembling an ultrasonic motor the ultrasonic motor drive section and drive circuit can be easily adjusted in phase characteristic by the phase adjusting section.

Consequently, after the manufacture, there is no need for conducting adjustment again upon assembling into an electronic appliance or during replacement, thus facilitating assembling into an electronic appliance or repair.

According to an ultrasonic motor in another aspect, the connection circuit means are provided integral with the support plate. Consequently, the connection circuit means and the support plate can be handled as a single unit. In addition to the above-described effect of the invention, an advantage is obtained such that the ultrasonic motor is easy to handle during manufacture thus reducing the number of manufacturing processes and relieving manufacturing labor.

According to the invention in another aspect, the electronic appliance has a ultrasonic motor that is easy to assemble, replace or repair.

What is claimed is:

1. An ultrasonic motor comprising: a piezoelectric element for undergoing expansive-and-contractive movement in response to application of a current; a vibration member in contact with the piezoelectric element for undergoing vibration in response to the expansive-and-contractive movement of the piezoelectric element; a moving member in contact with the vibration member to be driven in a given direction in response to vibration of the vibration member; a connection board for establishing an electrical connection of the piezoelectric element to an external device to drive the ultrasonic motor; and a drive circuit for supplying a current from a power source to the piezoelectric element, the drive circuit being disposed on the connection board.

2. An ultrasonic motor according to claim 1; wherein the connection board has a phase adjusting circuit formed thereon to adjust phase characteristics of the ultrasonic motor drive circuit.

3. An ultrasonic motor according to claim 2; further comprising a support plate for supporting the piezoelectric element, the vibration member and the moving member; wherein the connection board is formed integrally with the support plate.

4. An electronic appliance having a moving member driven by a motor; wherein the motor comprises the ultrasonic motor according to claim 2.

5. An ultrasonic motor according to claim 1; further comprising a support plate for supporting the piezoelectric element, the vibration member and the moving member; wherein the connection board is formed integrally with the support plate.

6. An electronic appliance having a driven member driven by a motor; wherein the motor comprises the ultrasonic motor according to claim 5.

7. An electronic appliance having a driven member driven by a motor; wherein the motor comprises the ultrasonic motor according to claim 1.

8. An ultrasonic motor according to claim 1; further comprising a phase adjusting circuit adjusting a phase characteristic of a drive circuit for supplying a current from a power source to the piezoelectric element; wherein the piezoelectric element, the vibration member, the moving member, the connection board, the drive circuit and the phase adjusting circuit are formed integrally as a single unit so that the ultrasonic motor can be installed to replace another ultrasonic motor in an apparatus without the need for performing phase adjustment since the drive circuit and the phase adjusting circuit are disposed on the connection board.

9. An ultrasonic motor comprising: a piezoelectric element for undergoing expansive-and-contractive movement in response to application of an alternating current; a vibration member in contact with the piezoelectric element for undergoing vibration in response to the expansive-and-contractive movement of the piezoelectric element; a moving member in contact with the vibration member to be driven in a given direction in response to vibration of the vibration member; a connection board for establishing an electrical connection of the piezoelectric element to an external device to drive the ultrasonic motor; and a phase adjusting circuit for adjusting a phase characteristic of a drive circuit for supplying a current from a power source to the piezoelectric element, the phase adjusting section being disposed on the connection board.

10. An ultrasonic motor according to claim 9; further comprising a support plate for supporting the piezoelectric element, the vibration member and the moving member; wherein the connection board is formed integrally with the support plate.

11. An electronic appliance having a driven member driven by a motor; wherein the motor comprises the ultrasonic motor according to claim 9.

12. An ultrasonic motor according to claim 9; wherein the piezoelectric element, the vibration member, the moving member, the connection board, and the phase adjusting circuit are formed integrally as a single unit so that the ultrasonic motor can be installed to replace another ultrasonic motor in an apparatus without the need for performing phase adjustment since the phase adjusting circuit is disposed on the connection board.

13. An ultrasonic motor comprising: a piezoelectric element for undergoing vibration in response to an applied alternating current signal; a vibrating body contacting the piezoelectric element to undergo vibration along with the piezoelectric element; a moving member contacting the vibrating body for undergoing movement in a desired direction in response to vibration of the vibrating body; a driving circuit for driving the ultrasonic motor; and a connector for connecting the piezoelectric element to the driving circuit; wherein the driving circuit is disposed on the connector.

14. An ultrasonic motor according to claim 13; wherein the driving circuit comprises an AC signal generating circuit for supplying an AC signal to the piezoelectric element and a phase adjusting device for adjusting phase characteristics of the AC signal generating circuit.

15. An ultrasonic motor according to claim 14; wherein the AC signal generating circuit is connected to a power source to convert a direct current output of the power source into an alternating current signal for driving the piezoelectric element, and the phase adjusting device adjusts a phase of the alternating current signal to match the phase characteristics of the combination of the piezoelectric element, the vibrating body and the moving member.

16. An ultrasonic motor according to claim 14; further comprising a support plate for supporting the piezoelectric element, the vibration member and the moving member; wherein the connector is formed integrally with the support member.

17. An ultrasonic motor according to claim 13; further comprising a support plate for supporting the piezoelectric element, the vibration member and the moving member; wherein the connector is formed integrally with the support member.

18. An ultrasonic motor according to claim 13; further comprising a support plate for supporting the piezoelectric element, the vibration member and the moving member; wherein the connector comprises a circuit pattern printed on the support member.

19. An ultrasonic motor according to claim 13; further comprising a phase adjusting circuit for adjusting a phase characteristic of the driving circuit; wherein the piezoelectric element, the vibrating body, the moving member and the driving circuit and the phase adjusting circuit are formed integrally as a single unit so that the ultrasonic motor can be installed to replace another ultrasonic motor in an apparatus without the need for performing phase adjustment since the phase adjusting circuit is disposed on the connector.

* * * * *